United States Patent
Cavaliere et al.

(10) Patent No.: US 11,264,624 B2
(45) Date of Patent: Mar. 1, 2022

(54) ELECTROCATALYST

(71) Applicants: JOHNSON MATTHEY FUEL CELLS LIMITED, London (GB); CENTRE NATIONAL DE LA RECHERCHE SCIENTIFIQUE, Paris (FR); UNIVERSITE MONTPELLIER, Montpellier (FR)

(72) Inventors: Sara Cavaliere, Montpellier (FR); Jacques Roziere, Montpellier (FR); Deborah Jones, Montpellier (FR); Yannick Najm Nabil-Moreau, Montpellier (FR)

(73) Assignee: Universite Montpellier, Montpellier (FR)

( * ) Notice: Subject to any disclaimer, the term of this patent is extended or adjusted under 35 U.S.C. 154(b) by 895 days.

(21) Appl. No.: 15/736,859

(22) PCT Filed: Jun. 29, 2016

(86) PCT No.: PCT/GB2016/051942
§ 371 (c)(1),
(2) Date: Dec. 15, 2017

(87) PCT Pub. No.: WO2017/001843
PCT Pub. Date: Jan. 5, 2017

(65) Prior Publication Data
US 2018/0159144 A1 Jun. 7, 2018

(30) Foreign Application Priority Data
Jun. 29, 2015 (GB) ...................................... 1511344

(51) Int. Cl.
*H01M 4/92* (2006.01)
*C25B 11/04* (2021.01)
(Continued)

(52) U.S. Cl.
CPC ........... *H01M 4/925* (2013.01); *C01B 32/914* (2017.08); *C25B 11/04* (2013.01); *C25B 11/091* (2021.01);
(Continued)

(58) Field of Classification Search
None
See application file for complete search history.

(56) References Cited

U.S. PATENT DOCUMENTS

2007/0179050 A1* 8/2007 Ma ........................... B01J 27/22
502/182
2014/0073499 A1 3/2014 Lee

FOREIGN PATENT DOCUMENTS

| CN | 103072987 | 5/2013 |
| WO | WO2005/020356 A1 | 3/2005 |
| WO | WO2013/144631 A1 | 3/2013 |
| WO | WO2014043603 A1 | 3/2014 |

OTHER PUBLICATIONS

Liu et al., Metal Carbides as Alternative Electrocatalyst Supports, ACS Catalysis (2013) 3 (6), pp. 1184-1194.
(Continued)

*Primary Examiner* — Guinever S Gregorio
(74) *Attorney, Agent, or Firm* — BakerHostetler

(57) ABSTRACT

An electrocatalyst material having improved stability to corrosion compared to existing conductive high surface area carbon and metal carbide support materials is disclosed. The electrocatalyst material comprises (i) metal carbide nanotubes and (ii) a metal or metal alloy deposited on the metal carbide nanotubes. The electrocatalyst material is suitable for oxidising hydrogen, reducing oxygen or evolving hydrogen.

13 Claims, 3 Drawing Sheets

SEM micrograph of the NbC nanotubes (3 hours' carburation)

(51) Int. Cl.
  *H01M 4/90* (2006.01)
  *C01B 32/914* (2017.01)
  *C25B 11/091* (2021.01)
  *H01M 8/1018* (2016.01)
  *H01M 8/10* (2016.01)

(52) U.S. Cl.
  CPC ....... *H01M 4/9075* (2013.01); *H01M 8/1018* (2013.01); *C01P 2004/13* (2013.01); *H01M 2008/1095* (2013.01)

(56) References Cited

OTHER PUBLICATIONS

Zhang et al., "A Highly Active, Stable and Synergistic Pt Nanoparticles/ Mo2C Nanotube Catalyst tor Methanol Electro-Oxidation," NPG Asia Materials, vol. 7, No. 1, Jan. 16, 2015, p. e153.

Wong et al., "Growth of Metal Carbide Nanotubes and Nanorods," Chem. Mater., 1996, 8 (8), pp. 2041-2046 (Publication Date Web: Aug. 14, 1996.

Viswanathamurthi et al., "Preparation and Morphology of Niobium Oxide Fibres by Electrospinning," Chemical Physics Letters, vol. 374, issues 1-2; Jun. 4, 2003, pp. 79-84.

Nakane, et al., "formation of niobium oxide and carbide nanofibers from poly(vinyl alcohol)/niobium oxide composite nanofibers," J. Mater. Sci (2013) 48: 7774-7779.

Du et al., Direct Synthesis of Poly(arylenedisulfide)/carbon Nanosheet Composites via the Oxidation With Graphite Oxide, CARBON, 43 (2005) 195-213.

GB1511344.2, UK Search Report. Under Section 17(5) dated Feb. 12, 2016.

PCT/GB2016/051942, International Search Report dated Oct. 4, 2016.

PCT/GB2016/051942, Written Opinion dated Oct. 4, 2016.

* cited by examiner

Figure 1: SEM micrograph of the NbC nanotubes (3 hours' carburation)
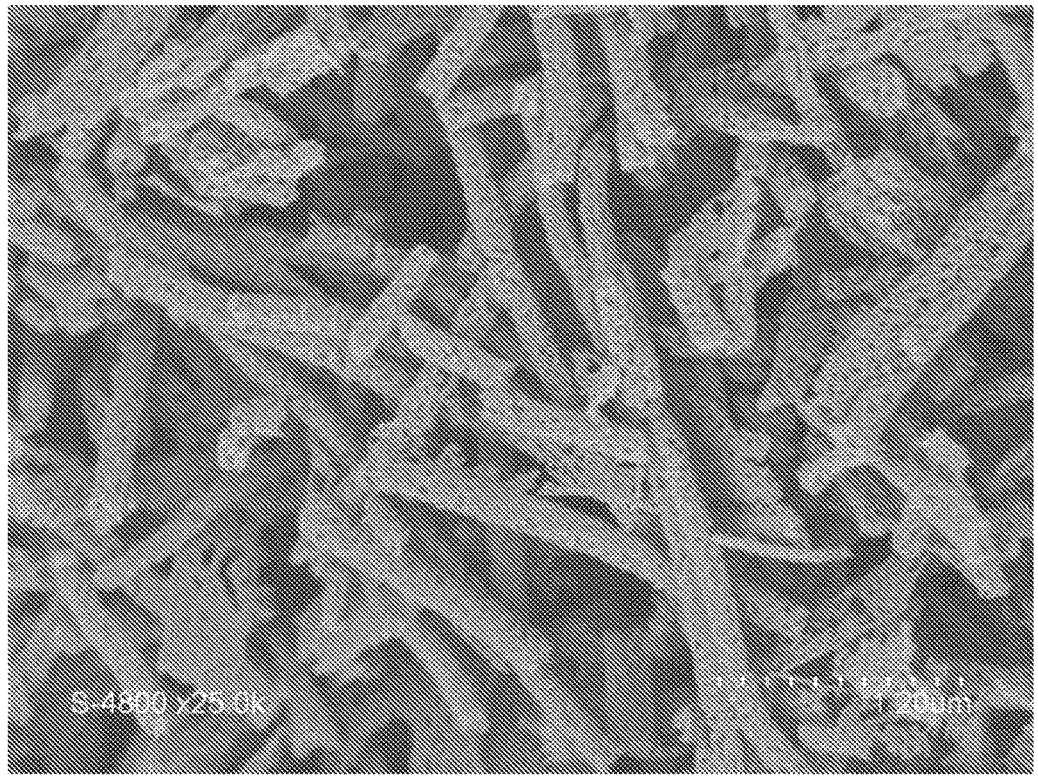
Figure 2: TEM cross-section of the NbC nanotube
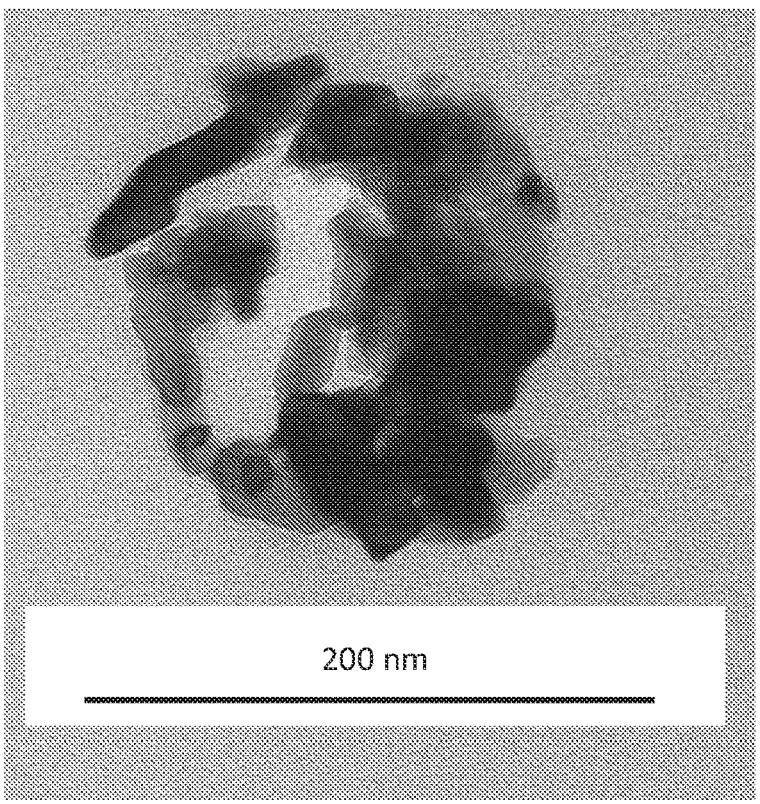

Figure 3: SEM micrograph of the NbC nanotubes (6 hours' carburation)
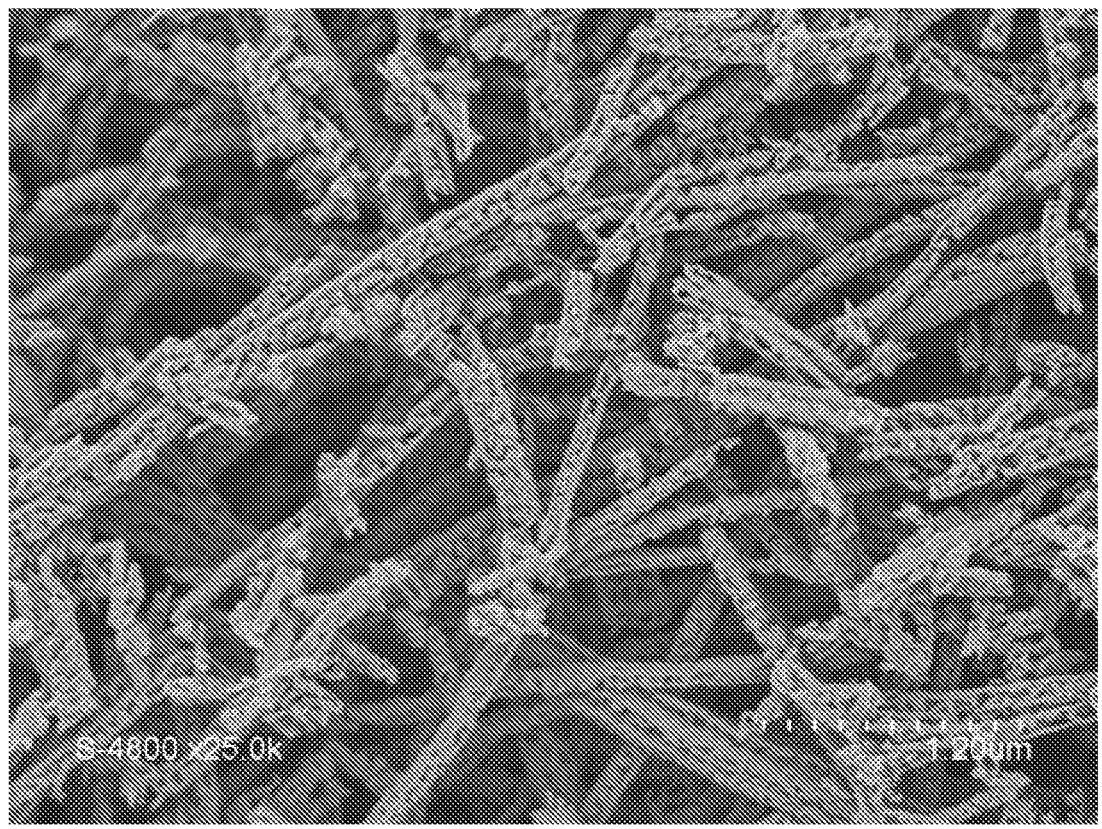
Figure 4: Stability of the ECSA of the catalysed supports (Example 1 and Comparative Examples 1 and 2) during the accelerated stress test to 1.2 V vs RHE
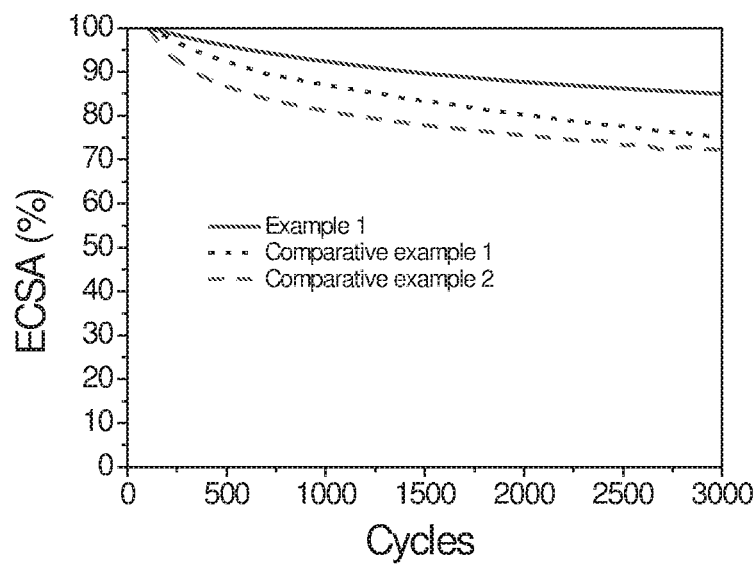

Figure 5: Stability of the ECSA of the catalysed supports (Example 1 and Comparative Examples 1 and 2) during the accelerated stress test to 1.4 V vs RHE
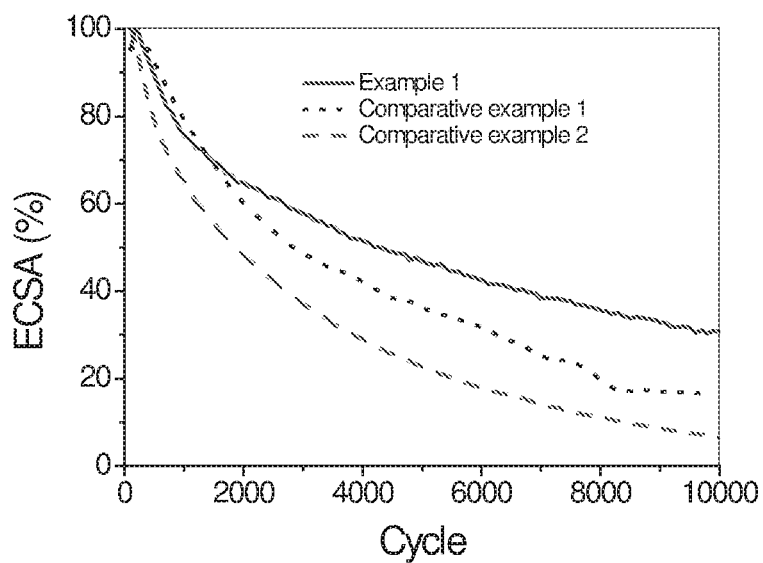

ELECTROCATALYST

CROSS-REFERENCE TO RELATED APPLICATIONS

This application is the National Stage of International Patent Application No. PCT/GB2016/051942 filed Jun. 29, 2016, which claims priority from Great Britain Patent Application No. 1511344.2 filed Jun. 29, 2015, the disclosures of each of which are incorporated herein by reference in their entirety.

FIELD OF THE INVENTION

The present invention relates to a new electrocatalyst material and its use, in particular its use in oxidising hydrogen, reducing oxygen, or evolving hydrogen particularly in a fuel cell or electrolyser electrode.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst material designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

The electrocatalyst layers generally comprise an electrocatalyst material comprising a metal or metal alloy suitable for the fuel oxidation or oxygen reduction reaction, depending on whether the layer is to be used at the anode or cathode.

The electrocatalyst layers also generally comprise a proton conducting material, such as a proton conducting polymer, to aid transfer of protons from the anode catalyst to the membrane and or from the membrane to the cathode catalyst.

Conventionally, the MEA can be constructed by a number of methods outlined hereinafter:

(i) The electrocatalyst layer may be applied to the gas diffusion layer to form a gas diffusion electrode. A gas diffusion electrode is placed on each side of an ion-conducting membrane and laminated together to form the five-layer MEA;

(ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically, tens or hundreds of MEAs are required to provide enough power for most applications, so multiple MEAs are assembled to make up a fuel cell stack. Flow field plates are used to separate the MEAs. The plates perform several functions: supplying the reactants to the MEAs; removing products; providing electrical connections; and providing physical support.

SUMMARY OF THE INVENTION

The electrocatalyst is typically based on platinum or platinum alloyed with one or more other metals. The platinum or platinum alloy catalyst can be in the form of unsupported nanoparticles (such as metal blacks or other unsupported particulate metal powders) but more conventionally the platinum or platinum alloy is deposited as higher surface area nanoparticles onto a high surface area conductive carbon material, such as a carbon black or heat-treated (graphitised) versions thereof. Although being widely used, these carbon supports suffer from oxidative corrosion on exposure to high voltages which can occur under many practical operational events, such as repeated incidences of start-stop or cell reversal. This oxidative corrosion of the support leads to a degradation of the catalyst and catalyst layer properties and a marked reduction in fuel cell performance.

Alternative support materials such as metal oxides or metal carbides have been considered and a recent review (Liu et al., ACS Catal. (2013) 3, 1184-1194) indicates that different transition metal carbides (in particular tungsten carbide and molybdenum carbide) are suitable as electrocatalyst supports for the oxygen reduction reaction and hydrogen evolution reaction. However, the long term stability of metal carbides, particularly in the presence of oxygen, has also raised some concerns over the practical use of metal carbides as catalyst support materials.

It is an object of the present invention to provide an electrocatalyst material having a transition metal carbide support material which shows improved stability to corrosion compared to existing conductive high surface area carbon and metal carbide support materials.

The present invention provides an electrocatalyst material, suitable for use in oxidising hydrogen, reducing oxygen or evolving hydrogen, the electrocatalyst material comprising:
 (i) metal carbide nanotubes
 (ii) a metal or metal alloy deposited on the metal carbide nanotubes, Also provided is a process for the preparation of an electrocatalyst material comprising:
 (i) metal carbide nanotubes; and
 (ii) a metal or metal alloy deposited on the metal carbide nanotubes;

said process comprising the steps of:
(i) electrospinning a suitable metal precursor in the presence of a carrier polymer to form electrospun structures;
(ii) calcination of the electrospun structures to remove the carrier polymer and form metal oxide electrospun structures;
(iii) carburation to convert the metal oxide electrospun structures into metal carbide nanotubes; and
(iv) deposition of a metal or metal alloy onto the metal carbide nanotubes.

Also provided is an electrocatalyst material comprising:
(i) metal carbide nanotubes; and
(ii) a metal or metal alloy deposited on the metal carbide nanotubes;
wherein the electrocatalyst material is obtainable by a process comprising the steps of:
(i) electrospinning a suitable metal precursor in the presence of a carrier polymer to form electrospun structures;
(ii) calcination of the electrospun structures to remove the carrier polymer and form metal oxide electrospun structures;
(iii) carburation to convert the metal oxide electrospun structures into metal carbide nanotubes; and
(iv) deposition of a metal or metal alloy onto the metal carbide nanotubes.

Also provided is an electrocatalyst ink comprising metal carbide nanotubes and a metal or metal alloy deposited on the metal carbide nanotubes.

Also provided is a catalyst layer, suitable for use at the anode of a fuel cell for oxidising hydrogen, the cathode of a fuel cell for reducing oxygen, or at the cathode of an electrolyser for hydrogen evolution, the catalyst layer comprising:
(i) metal carbide nanotubes; and
(ii) a metal or metal alloy deposited on the metal carbide nanotubes.

Also provided is a gas diffusion electrode, catalysed membrane, membrane electrode assembly and electrochemical cell comprising an electrocatalyst material of the invention.

Also provided is the use of an electrocatalyst material comprising metal carbide nanotubes and a metal or metal alloy deposited on the metal carbide nanotubes for the hydrogen oxidation reaction, oxygen reduction reaction or hydrogen evolution reaction.

Also provided is a process for making metal carbide nanotubes, said process comprising the steps of:
(i) electrospinning a suitable metal precursor in the presence of a carrier polymer to form electrospun structures;
(ii) calcination of the electrospun structures to remove the carrier polymer and form metal oxide electrospun structures; and
(iii) carburation to convert the metal oxide electrospun structures into metal carbide nanotubes.

Also provided are metal carbide nanotubes obtainable by a process comprising:
(i) electrospinning a suitable metal precursor in the presence of a carrier polymer to form electrospun structures;
(ii) calcination of the electrospun structures to remove the carrier polymer and form metal oxide electrospun structures;
(iii) carburation to convert the metal oxide electrospun structures into the metal carbide nanotubes.

BRIEF DESCRIPTION OF THE DRAWINGS

FIG. 1 shows an SEM micrograph of the NbC nanotubes of Example 1 formed after 3 hours carburation.
FIG. 2 shows a TEM micrograph cross-section of the NbC nanotubes of Example 1
FIG. 3 shows an SEM micrograph of the NbC nanotubes of Example 1 after 6 formed hours carburation.
FIG. 4 shows the stability of catalysed supports during an accelerated stress test involving voltage cycling to 1.2 V vs Reversible Hydrogen Electrode (RHE).
FIG. 5 shows the stability of catalysed supports during an accelerated stress test involving voltage cycling to 1.4 V vs RHE.

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

Metal Carbide Nanotubes

Nanotubes are defined as hollow 1D nanostructures with a continuous cylindrical cavity. Nanotubes are distinguished from nanofibres which possess a solid core. The term "1D" is used for objects such as nanotubes that are significantly longer than they are wide, i.e. they have a high length/diameter aspect ratio (e.g. of at least 2).

The metal carbide nanotubes are suitably selected from the group consisting of Group IV metal (titanium, zirconium, hafnium), Group V metal (vanadium, niobium, tantalum) and Group VI metal (chromium, molybdenum, tungsten) carbide nanotubes.

Suitably, the metal carbide nanotubes are selected from the group consisting of titanium, zirconium, hafnium, vanadium, niobium, tantalum, molybdenum and tungsten carbide nanotubes.

Suitably, the metal carbide nanotubes are selected from the group consisting of titanium, zirconium, niobium, tungsten, tantalum and molybdenum carbide nanotubes.

Suitably, the metal carbide nanotubes are selected from the group consisting niobium, tungsten and tantalum carbide nanotubes.

Suitably the metal carbide nanotubes are niobium carbide nanotubes.

The metal carbide nanotubes may be prepared by any known method, for example by electrospinning, or by reacting carbon nanotubes with a metal species to form the metal carbide nanotube as described in Chem. Mater. (1996) 8, 2041-2046 or Carbon (2005) 43, 195-213.

A preferred process is to use an electrospinning process to prepare the metal carbide nanotubes. Thus, a further aspect of the invention provides a process for the preparation of metal carbide nanotubes comprising:
(i) electrospinning a suitable metal precursor in the presence of a carrier polymer to form electrospun structures;
(ii) calcination of the electrospun structures to remove the carrier polymer and form metal oxide electrospun structures;
(iii) carburation to convert the metal oxide electrospun structures into the metal carbide nanotubes.

A still further aspect of the invention provides metal carbide nanotubes obtainable by a process comprising:
(i) electrospinning a suitable metal precursor in the presence of a carrier polymer to form electrospun structures;
(ii) calcination of the electrospun structures to remove the carrier polymer and form metal oxide electrospun structures;
(iii) carburation to convert the metal oxide electrospun structures into the metal carbide nanotubes.

The metal precursor is required to be soluble in water. Examples of suitable metal precursors include oxalates, ethoxides (e.g. as described in Chem. Phys. Lett. (2003) 374, 79-84), sols (as described in J. Mater. Sci. (2013) 48, 7774-7779) etc. More specifically, the metal precursor may be an ammonium metal oxalate, for example ammonium niobate oxalate, ammonium metatungsten oxalate or ammonium tantalum oxalate.

The carrier polymer is partially or completely removed during the calcination step, its role being to facilitate the electrospinning step. The carrier polymer may be any polymer suitable for electrospinning and includes, but is not limited to, polyvinylpyrrolidone, polybenzimidazole, polyvinylbutyral, polyvinylalcohol, polyvinyl acetate, polyacrylonitrile, polyureaformamide, polyethyleneglycol, polyurethane, polyethylene oxide, polyvinylidene fluoride, polyvinyl chloride, polycarbonate, polymethacrylate, polyethylene terephthalate, polystyrene, cellulose acetate, etc.

The electrospun structures formed in the step (i) are typically in the form of electrospun nanofibres of the metal precursor.

The calcination step (step (ii)) is carried out in an oxidising atmosphere, such as air, at a temperature of from 450° C. to 800° C., suitably from 500° C. to 700° C. The actual temperature will depend on the particular carrier polymer used and thermogravimetric analysis (TGA) can be used to determine the temperature at which the carrier polymer is completely removed. The calcination step converts the metal precursor nanofibres to metal oxide nanofibres.

The carburation step (step (iii)) requires a carbon source in a reducing atmosphere. The carbon source may be a mixture of a hydrocarbon, e.g. methane, in hydrogen gas. Alternatively, if the carrier polymer is not completely calcined during the calcination step, residual carbon from the carrier polymer remaining can be used as the carbon source in place of some of the hydrocarbon. During the carburation step, the metal oxide nanofibres are converted into metal carbide nanotubes.

The ratio of carbon source to reducing gas (e.g. hydrogen) is suitably at least 5:95, suitably at least 10:90. The ratio of carbon source to reducing gas is suitably less than or equal to 25:75, suitably less than or equal to 20:80.

The carburation is carried out in a temperature reduction furnace equipped with a thermal conductivity detector (TCD) signal, to enable progress of the reaction to be followed and the temperature/time parameters to be optimised. The temperature is slowly increased to a final temperature until the reaction is complete. A lower final temperature can be used if the overall reaction time is increased. Such optimisation is within the ability of the skilled person.

It has also been found that increasing the time of the carburation step results in different grain sizes of the metal carbide nanotube. For example, an increase in the time results in nanotubes with 'porous walls' or 'pea like' nanotubes.

In an optional step, following the carburation step, the formed carbide is cooled under hydrogen.

Following preparation of the nanotube, some residual carbon may remain in the nanotube. The residual carbon ($C_{residual}$) is suitably present at a level of less than 10 wt %, and preferably less than 5 wt % relative to the total weight of the nanotube (metal carbide+$C_{residual}$).

The level of residual carbon is determined using TGA. Calibration is made using standards prepared by mixing known amounts of a pure metal carbide doped with different levels of a carbon based material, such as Cabot Vulcan XC72R.

Alternatively, the level of residual carbon is determined using elemental analysis as known to those skilled in the art. Combustion of the nanotubes in a furnace at approximately 1000° C. in an oxygen rich atmosphere is carried out and the residual carbon content monitored by following the amount of $CO_2$ formed during the process with gas chromatography.

The external diameter of the nanotubes is suitably at least 75 nm, suitably at least 100 nm; the external diameter of the nanotubes is suitably less than or equal to 250 nm, suitably less than or equal to 200 nm. In one aspect of the invention, at least 80% of the nanotubes have a diameter within this range, suitably at least 85% and preferably at least 90%. The diameter can be determined using conventional techniques, such as analysis by field emission scanning electron microscopy, e.g. using a Hitachi S-4800 scanning electron microscope.

The internal diameter of the nanotubes is approximately 35-55% of the external diameter as observed using transmission electron microscopy).

The length of the nanotubes is not critical to the invention; the length of the nanotubes should be such that the nanotubes have a length/diameter aspect ratio of at least 2. Thus, suitably, the nanotubes have a minimum length of 150 nm. The actual length of the nanotubes will be dependent on the use and can be ascertained by the skilled person.

A cross-section of the metal carbide nanotube showing a hollow core can be obtained using transmission electron microscopy (TEM).

Metal or Metal Alloy

The metal or metal alloy deposited on the metal nanotube may be any metal or metal alloy known to those skilled in the art as having activity for an electrochemical reaction, such as a hydrogen oxidation reaction, oxygen reduction reaction, hydrogen evolution reaction etc.

The metal or metal alloy comprises a primary metal suitably selected from
(i) the platinum group metals (platinum, palladium, rhodium, ruthenium, iridium and osmium),
(ii) gold or silver,
(iii) a base metal.

The primary metal may be alloyed or mixed with one or more different metals selected from the above i.e. (i) the platinum group metals, (ii) gold or silver (iii) and a base metal or their oxides. The primary metal is preferably platinum, which may be alloyed with other precious metals (platinum group metals, gold and silver), such as ruthenium, or one or more base metals.

The loading of the primary metal in the electrocatalyst material is suitably ≥10 wt %, more suitably ≥20 wt %; the loading of the primary metal in the electrocatalyst is suitably ≤70 wt %, suitably ≤50 wt %, more suitably ≤30 wt %. The loading is based on the total weight of the catalysed nanotube (metal/metal alloy+metal carbide+$C_{residual}$).

Deposition of the Metal or Metal Alloy on the Metal Carbide Nanotube

Deposition of the metal or metal alloy particles onto the metal carbide nanotubes can be performed in a number of ways:
(i) forming metal or metal alloy nanoparticles and subsequently depositing the nanoparticles onto the metal carbide nanotube (a two-step synthesis process)
(ii) forming and depositing the metal or metal alloy nanoparticles from a solution of the metal precursor(s) directly onto the metal carbide nanotube in situ (a one-step synthesis process)
(iii) direct deposition of films of the metal or metal alloy by physical deposition methods, such as atomic layer deposition, or electrochemical methods, to form an extended thin film of metal or metal alloy on the surface of the metal carbide nanotube.

A two-step process is carried out by first forming the metal or metal alloy particles by conventional methods and subsequently depositing the formed metal or metal alloy particles onto the metal carbide nanotube.

In the one step process, the metal carbide nanotubes and a metal or metal alloy catalyst precursor are mixed and metal or metal alloy particles formed directly on the metal carbide nanotube.

In the direct deposition method, a continuous, conformal thin film of metal or metal alloy is formed on the metal carbide nanotubes by methods including but not limited to vacuum techniques including plasma assisted, gas phase techniques including plasma assisted, electrochemical techniques or chemical deposition. In particular, the following techniques may be used: atomic layer deposition, electrodeposition, electrophoresis, chemical vapour deposition, physical vapour deposition, plasma assisted deposition techniques, sputtering and evaporation. Such continuous, conformal thin films are described in more detail in WO2013/144631.

A further aspect of the provides a process for the preparation of an electrocatalyst material comprising:
(i) metal carbide nanotubes; and
(ii) a metal or metal alloy deposited on the metal carbide nanotubes;
said process comprising the steps of:
(i) electrospinning a suitable metal precursor in the presence of a carrier polymer to form electrospun structures;
(ii) calcination of the electrospun structures to remove the carrier polymer and form metal oxide electrospun structures; and
(iii) carburation to convert the metal oxide electrospun structures into metal carbide nanotubes
(iv) deposition of a metal or metal alloy onto the metal carbide nanotubes.

A still further aspect of the invention provides an electrocatalyst material comprising:
(i) metal carbide nanotubes; and
(ii) a metal or metal alloy deposited on the metal carbide nanotubes;
wherein the electrocatalyst material is obtainable by a process comprising the steps of:
(i) electrospinning a suitable metal precursor in the presence of a carrier polymer to form electrospun structures;
(ii) calcination of the electrospun structures to remove the carrier polymer and form metal oxide electrospun structures; and
(iii) carburation to convert the metal oxide electrospun structures into metal carbide nanotubes
(iv) deposition of a metal or metal alloy onto the metal carbide nanotubes.

The electrocatalyst material of the invention has particular utility for catalysing an electrochemical reaction (the oxygen reduction reaction, hydrogen oxidation reaction or hydrogen evolution reaction) taking place at either the anode or cathode of an electrochemical cell, such as a fuel cell or an electrolyser. In particular, the electrocatalyst material of the invention has particular utility in catalysing the oxygen reduction reaction at the cathode of a fuel cell.

Thus there is further provided an electrocatalyst material of the invention for use at the anode or cathode of an electrochemical cell. Alternatively, there is provided the use of an electrocatalyst material of the invention at the anode or cathode of an electrochemical cell.

The electrocatalyst materials of the invention have particular use in a catalyst layer, for example for use in a gas diffusion electrode of an electrochemical cell, such as a fuel cell or an electrolyser, in particular a PEMFC, or in a catalyst coated ion-conducting membrane of a PEMFC. Thus, there is further provided a catalyst layer comprising the electrocatalyst material of the invention. The catalyst layer may be prepared by a number of methods know to those skilled in the art, for example by preparation of an ink and applying the ink to a membrane, gas diffusion layer or transfer substrate by standard methods such as gravure coating, slot die (slot, extrusion) coating (whereby the coating is squeezed out under pressure via a slot onto the substrate), screen printing, rotary screen printing, inkjet printing, spraying, painting, bar coating, pad coating, gap coating techniques such as knife or doctor blade over roll (whereby the coating is applied to the substrate then passes through a split between the knife and a support roller), and metering rod application such as with a Meyer bar. The invention further provides an electrocatalyst ink comprising metal carbide nanotubes and a metal or metal alloy deposited on the metal carbide nanotubes.

The thickness of the catalyst layer and loading of primary metal in the catalyst layer will depend on the electrochemical cell and whether the catalyst layer is for use at the anode or cathode.

If for use at the anode of a fuel cell to catalyse the hydrogen oxidation reaction:
the catalyst layer is suitably $\geq 1$ μm; more suitably $\geq 2$ μm in thickness; preferably $\geq 5$ μm;
the catalyst layer is suitably $\leq 15$ μm; more suitably $\leq 10$ μm in thickness;
the loading of primary metal is suitably $\leq 0.3$ mg/cm$^2$; suitably $\leq 0.2$ mg/cm$^2$; more suitably $\leq 0.15$ mg/cm$^2$;
the loading of primary metal is suitably $\geq 0.02$ mg/cm$^2$.

If for use at the cathode of a fuel cell to catalyse the oxygen reduction reaction:
the catalyst layer is suitably $\geq 2$ μm; more suitably $\geq 5$ μm in thickness;
the catalyst layer is suitably $\leq 20$ μm; more suitably $\leq 15$ μm in thickness;
the loading of primary metal in the catalyst layer is $\leq 0.4$ mg/cm$^2$, suitably $\leq 0.25$ mg/cm$^2$;
the loading of primary metal in the catalyst layer is $\geq 0.05$ mg/cm$^2$, suitably $\geq 0.1$ mg/cm$^2$.

If for use at the cathode of an electrolyser to catalyse the hydrogen evolution reaction:
the catalyst layer is suitably $\geq 1$ μm; more suitably $\geq 5$ μm in thickness;

the catalyst layer is suitably ≤20 μm; more suitably ≤15 μm in thickness;

the loading of primary metal in the catalyst layer is ≤0.7 mg/cm$^2$, suitably ≤0.5, mg/cm$^2$;

the loading of primary metal in the catalyst layer is ≥0.05 mg/cm$^2$, suitably ≥0.1 mg/cm$^2$.

The catalyst layer may also comprise additional components. Such components include, but are not limited to: a proton conductor (e.g. a polymeric or aqueous electrolyte, such as a perfluorosulphonic acid (PFSA) polymer (e.g. Nafion™), a hydrocarbon proton conducting polymer (e.g. sulphonated polyarylenes) or phosphoric acid); a hydrophobic (a polymer such as PTFE or an inorganic solid with or without surface treatment) or a hydrophilic (a polymer or an inorganic solid, such as an oxide) additive to control water transport. In addition the catalyst layer may also comprise a further catalytic material, which may or may not have the same function as the electrocatalyst material of the invention. For example, where the electrocatalyst material of the invention is employed as an oxygen reduction catalyst, the additional catalytic material may be added to mitigate the degradation caused by repeated start-up/shut-down cycles by catalysing the oxygen evolution reaction (and, for example, comprise a ruthenium and/or iridium based metal oxide). In a further example, the additional catalyst may promote the decomposition of hydrogen peroxide (and for example comprise ceria or manganese dioxide).

The invention further provides a gas diffusion electrode comprising a gas diffusion layer (GDL) and a catalyst layer according to the present invention. Typical GDLs are suitably based on conventional non-woven carbon fibre gas diffusion substrates such as rigid sheet carbon fibre papers (e.g. the TGP-H series of carbon fibre papers available from Toray Industries Inc., Japan) or roll-good carbon fibre papers (e.g. the H2315 based series available from Freudenberg FCCT KG, Germany; the Sigracet® series available from SGL Technologies GmbH, Germany; the AvCarb® series available from AvCarb Material Solutions; or the N0S series available from CeTech Co., Ltd. Taiwan), or on woven carbon fibre cloth substrates (e.g. the SCCG series of carbon cloths available from the SAATI Group, S.p.A., Italy; or the W0S series available from CeTech Co., Ltd, Taiwan). For many PEMFC (including direct methanol fuel cell (DMFC)) applications the non-woven carbon fibre paper, or woven carbon fibre cloth substrates are typically modified with a hydrophobic polymer treatment and/or application of a macroporous layer comprising particulate material either embedded within the substrate or coated onto the planar faces, or a combination of both to form the gas diffusion layer. The particulate material is typically a mixture of carbon black and a polymer such as polytetrafluoroethylene (PTFE). Suitably the GDLs are between 100 and 400 μm thick. Preferably there is a layer of particulate material such as carbon black and PTFE on the face of the GDL that contacts the catalyst layer.

In the PEMFC, the catalyst layer of the invention may be deposited onto one or both faces of the proton conducting membrane to form a catalysed membrane. In a further aspect the present invention provides a catalysed membrane comprising a proton conducting membrane and a catalyst layer of the invention.

The membrane may be any membrane suitable for use in a PEMFC, for example the membrane may be based on a perfluorinated sulphonic acid (PFSA) material. Membranes formed from these ionomers are sold under the trade names Nafion™ (e.g. N115 or N117 from Chemour Company), Flemion™ (Asahi Glass Group) and Aciplex™ (Asahi Kasei Chemicals Corp.). Other fluorinated-type membranes include those sold under the Fumapem-TM-F (e.g. F-930 or F-950 from MuMA-Tech GmbH), Aquivion™ from Solvay Specialty Polymers and the GEFC-10N series from Golden Energy Fuel Cell Co., Ltd. these membranes may be used unmodified, or may be modified to improve the high temperature performance, for example by incorporating an additive. Alternatively, the membrane may be based on a sulphonated hydrocarbon membrane such as those available from FuMA-Tech GmbH as the fumapem® P, E or K series of products, JSR Corporation, Toyobo Corporation, and others. The membrane may be a composite membrane, containing the proton-conducting material and other materials that confer properties such as mechanical strength. For example, the membrane may comprise an expanded PTFE substrate. Alternatively, the membrane may be based on polybenzimidazole doped with phosphoric acid and which operates in the range 120° C. to 180° C.

In a further embodiment of the invention, the substrate onto which the catalyst layer of the invention is applied is a transfer substrate. Accordingly, a further aspect of the present invention provides a catalysed transfer substrate comprising transfer substrate and a catalyst layer of the invention. The transfer substrate may be any suitable transfer substrate known to those skilled in the art but is preferably a polymeric material such as polytetrafluoroethylene (PTFE), polyimide, polyvinylidene difluoride (PVDF), or polypropylene (especially biaxially-oriented polypropylene, BOPP) or a polymer-coated paper such as polyurethane coated paper. The transfer substrate could also be a silicone release paper or a metal foil such as aluminium foil. The catalyst layer of the invention may then be transferred to a GDL or membrane by techniques known to those skilled in the art.

A yet further aspect of the invention provides a membrane electrode assembly comprising a catalyst layer, electrode or catalysed membrane according to the invention. The MEA may be made up in a number of ways including, but not limited to:

(i) a proton conducting membrane may be assembled and bonded between two electrodes (one anode and one cathode), at least one of which is a gas diffusion electrode according to the present invention;

(ii) a catalyst-coated membrane coated on one side only by a catalyst layer may be assembled and preferably bonded between a gas diffusion layer and a gas diffusion electrode, the gas diffusion layer contacting the side of the membrane coated with the catalyst layer, and wherein at least one of the catalyst layer and the electrode comprises a catalyst layer of the invention;

(iii) a catalyst-coated membrane coated on both sides with a catalyst layer may be assembled and preferably bonded between two gas diffusion layers, and wherein at least one of the catalyst layers comprises a catalyst layer according to the present invention.

The MEA may further comprise components that seal and/or reinforce the edge regions of the MEA for example as described in WO2005/020356. The MEA is assembled by conventional methods known to those skilled in the art.

The invention will be described further with reference to the following examples, which are illustrative and not limiting of the invention.

EXAMPLE 1

Catalysed Niobium Carbide Nanotubes

Preparation of Niobium Carbide Nanotubes

Niobium carbide nanotubes were prepared using the following process. Electrospinning solutions were prepared by mixing a solution of 1.8 g of ammonium niobate oxalate (ANO) dissolved in 5 g of distilled water and polyvinyl pyrrolidone (PVP, Mw 1,300,000, purchased from Aldrich) dissolved in 4 g of ethanol respectively.

The ANO/PVP composite fibres were prepared by a conventional electrospinning setup, which consists of a high voltage power supply (0-20 kV) and a syringe with a stainless steel needle. The electrospinning process was carried out at a fixed voltage of 15 kV, and the fibres at a flow of 0.2 mL/h.

The collected ANO-PVP composite fibres were oxidized in air at 600° C. for 3 h. The samples were then heated at 1100° C. in 10% $CH_4$/90% $H_2$ mixture gases with a total flow rate of 100 mL/min. The reaction was stopped after the conversion of $Nb_2O_5$ to NbC. The process conditions are summarised in Table 1.

TABLE 1

| NbC nanotubes synthesis route details | |
|---|---|
| Step | Conditions |
| Electrospinning | PVP (13%)/ANO (19.5%) |
| | Solvent: $H_2O$/EtOH (50/50 volume) |
| Calcination | 1 h 150° C. → 1 h 250° C. → 3 h 600° C. in air |
| | (ramp up 0.5° C. $min^{-1}$/0.5° C. $min^{-1}$/ 5° C. $min^{-1}$) |
| Carburation | 1100° C. in $CH_4/H_2$ held for 180 minutes |
| | (ramp up 4° C. $min^{-1}$) |

FIG. 1 shows a SEM micrograph of the niobium carbide nanotubes obtained by the above process.

FIG. 2 shows a TEM micrograph cross-section of the niobium carbide nanotube obtained by the above process.

FIG. 3 shows a SEM micrograph of niobium carbide nanotubes prepared by a similar process to that above, but wherein the carburation time is 6 hours instead of 3 hours.

Deposition of Platinum on the Nanotubes

A microwave-assisted polyol method was used to synthesise Pt nanocatalyst particles. 70 mg of hexachloroplatinic acid ($H_2PtCl_6 \cdot 6H_2O$, 99.9% Alfa Aesar) were dissolved in 50 mL of ethylene glycol (99.5%, Fluka) and the pH adjusted to pH 11 using 1 M NaOH solution (98%, Sigma Aldrich) in ethylene glycol. The resulting solution was heated at 120° C. for 6 minutes in a microwave reactor (MiniFlow 200SS Sairem). A suspension containing 40 mg of the NbC nanotubes in 5 mL ethylene glycol was added to the as-synthesised Pt nanoparticle suspension and the pH adjusted to 2. After gentle stirring for 24 hours, the product was recovered by filtration, washed with milli-Q water and ethanol and dried overnight at 80° C. The loading of platinum (as measured by scanning electron microscopy—energy dispersive x-ray spectroscopy (SEM-EDX)) on the niobium carbide nanotubes (including any residual carbon) was 30 wt %. The amount of residual carbon was investigated by thermogravimetric analysis via a calibration that links the mass variation with the NbC/C ratio; the amount of residual carbon was 4 wt %. (wrt to the total weight of $NbC+C_{residual}$).

COMPARATIVE EXAMPLE 1

Catalysed Niobium Carbide Nanofibres

Preparation of Niobium Carbide Nanofibres

Niobium carbide nanofibres were prepared using the following process. An electrospinning solution was prepared by adding 0.76 g of niobium chloride to a solution of 0.45 g of polyacrylonitrile (PAN) dissolved in 6 g of dimethylformamide (DMF). The solution was stirred overnight before being electrospun at 0.3 mL/hour with a 12 kV voltage by an electrospinning setup comprising a high voltage power supply (0-20 kV) and a syringe with a stainless steel needle. The collected $Nb_2O_5$-PAN composite fibres were directly carburised under argon at 1100° C. for 3.5 hours. The process conditions are summarised in Table 2.

TABLE 2

| NbC nanofibres synthesis route details | |
|---|---|
| Step | Conditions |
| Electrospinning | PAN (7% w)/$NbCl_5$ (10% w) |
| | Solvent: DMF |
| Carburation | 1 h 150° C. → 1 h 250° C. → 3.5 h 1100° C. in argon |
| | (ramp up 0.5° C. $min^{-1}$/0.5° C. $min^{-1}$/5° C. $min^{-1}$) |

Deposition of Platinum on the Nanofibres

Platinum catalyst nanoparticles were prepared and deposited on the niobium carbide nanofibres using an analogous process to that described in Example 1. The loading of platinum on the niobium carbide nanofibres was 15 wt %.

COMPARATIVE EXAMPLE 2

Catalysed Carbon Black

A platinum/carbon black catalyst HiSPEC™ 8000 was obtained from Alfa Aesar® having a platinum loading of 50 wt %.

Preparation of Electrode

The ex-situ electrochemical analyses were carried out in a conventional three-electrode cell consisting of a glassy carbon rotating disk electrode (RDE) (working electrode, geometric area of 0.196 $cm^2$), a reversible hydrogen electrode (reference electrode, RHE) and a platinum wire (counter electrode). A Pine bipotentiostat model AFCBP1 was used. All the potential values are referred to the RHE.

A catalyst ink was prepared using standard methods and the following materials: 10 mg catalysed support (Example 1, Comparative Example 1 and Comparative Example 2); 35 μL Nafion (5%) (Aldrich); 1 mL water (milli-Q water); and 4 mL isopropanol (Aldrich). 10 μL of the catalyst ink (6 μL for the ink comprising Comparative Example 2) was deposited onto the electrode to give 6 $μg_{Pt}$/electrode.

Electrochemical Surface Area

Cyclic voltammetry was carried out at 50 mV/s in $N_2$ saturated $HClO_4$ (0.1 M solution) and the electrochemical surface area (ECSA) of the platinum catalyst was calculated by integrating the peak corresponding to desorption of hydrogen from the Pt sites.

Two accelerated stress tests were performed to investigate the stability of the catalysed supports by monitoring the ECSA. Cyclic voltammetry between 0.03 V and 1.2 V for 3000 cycles and between 0.6 V and 1.4 V for 10000 cycles each at 500 mV/s was carried out. Every 100 cycles, two cycles were performed at a slower rate of 50 mV/s and the ECSA calculated from these cycles. The results are given in FIGS. 4 and 5 respectively.

Table 3 provides a summary of the initial ECSA and the ECSA loss after the two accelerated stress tests.

TABLE 3

ECSA and ECSA loss during the accelerated stress test to 1.4 V and 1.2 V

| | Pt loading (%) | Initial ECSA (m²/g) | ECSA loss after 3000 cycles up to 1.2 V vs RHE | ECSA after 3000 cycles up to 1.2 V (m²/g) | ECSA loss after 10000 cycles up to 1.4 V vs RHE | ECSA after 10000 cycles up to 1.4 V vs RHE (m²/g) |
|---|---|---|---|---|---|---|
| Example 1 | 30 | 43 | −12% | 38 | −69% | 13 |
| Comparative Example 1 | 15 | 26 | −20% | 21 | −80% | 5.2 |
| Comparative Example 2 | 50 | 52 | −25% | 39 | −95% | 2.6 |

The electrocatalyst material of the invention (Example 1) shows an initial high platinum surface area (ECSA) comparable with Comparative Example 2 and far superior to that of Comparative Example 1. After electrochemical cycling for 3000 cycles up to 1.2 V vs RHE, the ECSA of Example 1 is the same as that for Comparative Example 2 (and greater than that for Comparative Example 1) and after 10000 cycles up to 1.4 V vs RHE, the ECSA of Example 1 far exceed that of Comparative Example 1 and Comparative Example 2. Thus, Example 1 shows improved stability when compared with Comparative Examples 1 and 2.

The invention claimed is:

1. An electrocatalyst material, the electrocatalyst material comprising:
   metal carbide nanotubes comprising metal carbide and less than 5 wt % carbon; and,
   (ii) a metal or metal alloy deposited on the metal carbide nanotubes.

2. The electrocatalyst material according to claim 1, wherein the metal carbide nanotubes are selected from the group consisting of Group IV metal, Group V metal and Group VI metal carbide nanotubes.

3. The electrocatalyst material according to claim 2, wherein the metal carbide nanotubes are selected from the group consisting of titanium, zirconium, hafnium, vanadium, niobium, tantalum, molybdenum and tungsten carbide nanotubes.

4. The electrocatalyst material according to claim 3, wherein the metal carbide nanotubes are niobium carbide nanotubes.

5. The electrocatalyst according to claim 1, wherein the metal or metal alloy comprises a primary metal suitably selected from
   (i) the platinum group metals (platinum, palladium, rhodium, ruthenium, iridium and osmium),
   (ii) gold or silver,
   (iii) a base metal.

6. The electrocatalyst material according to claim 5, wherein the primary metal is platinum.

7. The electrocatalyst material according to claim 6, wherein the platinum is alloyed with one or more other platinum group metals, gold, silver or a base metal.

8. An electrocatalyst ink comprising an electrocatalyst material according to claim 1.

9. A catalyst layer, the catalyst layer comprising an electrocatalyst material according to claim 1.

10. A process for the preparation of an electrocatalyst material according to claim 1, said process comprising the steps of:
    (i) electrospinning a suitable metal precursor in the presence of a carrier polymer to form electrospun structures;
    (ii) calcination of the electrospun structures to remove the carrier polymer and form a metal oxide electrospun structures;
    (iii) carburation to convert the metal oxide electrospun structures into metal carbide nanotubes; and
    (iv) deposition of a metal or metal alloy onto the metal carbide nanotubes.

11. An electrocatalyst material comprising:
    (i) metal carbide nanotubes comprising metal carbide and less than 5 wt % carbon; and
    (ii) a metal or metal alloy deposited on the metal carbide nanotubes;
    wherein the electrocatalyst material is obtainable by a process according to claim 10.

12. A process for making metal carbide nanotubes, said process comprising the steps of:
    (i) electrospinning a suitable metal precursor in the presence of a carrier polymer to form electrospun structures;
    (ii) calcination of the electrospun structures to remove the carrier polymer and form a metal oxide electrospun structures; and
    (iii) carburation to convert the metal oxide electrospun structures into metal carbide nanotubes comprising metal carbide and less than 5 wt % carbon.

13. Metal carbide nanotubes that are produced by a process comprising:
    (i) electrospinning a suitable metal precursor in the presence of a carrier polymer to form electrospun structures;
    (ii) calcination of the electrospun structures to remove the carrier polymer and form metal oxide electrospun structures;
    (iii) carburation to convert the metal oxide electrospun structures into the metal carbide nanotubes comprising metal carbide and less than 5 wt % carbon.

\* \* \* \* \*